US010246101B2

(12) United States Patent
She et al.

(10) Patent No.: US 10,246,101 B2
(45) Date of Patent: Apr. 2, 2019

(54) DRIVER TRAINING SYSTEM

(71) Applicant: Ford Global Technologies, LLC, Dearborn, MI (US)

(72) Inventors: Eric She, Troy, MI (US); Scott J. Lauffer, Northville, MI (US); Ali Abdallah, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 156 days.

(21) Appl. No.: 15/404,605

(22) Filed: Jan. 12, 2017

(65) Prior Publication Data
US 2018/0194362 A1 Jul. 12, 2018

(51) Int. Cl.
*B60W 50/00* (2006.01)
*B60W 10/18* (2012.01)
(Continued)

(52) U.S. Cl.
CPC ........ *B60W 50/0098* (2013.01); *B60W 10/18* (2013.01); *B60W 10/20* (2013.01); *B60W 40/08* (2013.01); *B60W 50/12* (2013.01); *G05D 1/0061* (2013.01); *B60W 30/09* (2013.01); *B60W 2040/0809* (2013.01); *B60W 2420/42* (2013.01);
(Continued)

(58) Field of Classification Search
CPC .. B60W 50/0098; B60W 50/12; B60W 40/08; B60W 10/20; B60W 10/18; B60W 2540/12; B60W 2540/10; B60W 2040/0809; B60W 30/09; B60W 2420/42; B60W 2540/18; B60W 2420/52; G05D 1/0061; G01S 19/42
See application file for complete search history.

(56) References Cited

U.S. PATENT DOCUMENTS 6,151,539 A * 11/2000 Bergholz ............. G01S 13/931
340/435
6,356,836 B1 * 3/2002 Adolph ................. G01C 21/26
701/410
(Continued)

FOREIGN PATENT DOCUMENTS

DE 102011086897 A1 5/2013
EP 2312552 A2 4/2011
(Continued)

OTHER PUBLICATIONS

Harley, Michael, "Autonomous Race Trainer Eliminates Driving Instructors," http://www.forbes.com/sites/michaelharley/2016/10/10/volkswagen-autonomous-race-trainer-eliminates-driving-instructors/#4b5617fd38b8; Oct. 10, 2016; 11 pages.
(Continued)

*Primary Examiner* — Mary Cheung
(74) *Attorney, Agent, or Firm* — Frank A. MacKenzie; Bejin Bieneman PLC

(57) ABSTRACT

A computer in a vehicle is programmed to operate a vehicle along a predefined course according to predetermined criteria, record an optimal path through the predefined course based on operation of the vehicle according to the predetermined criteria, monitor operation of at least one vehicle control while the vehicle is operated by a human driver along the predefined course, and actuate the at least one vehicle control based on a predetermined deviance from the optimal path.

20 Claims, 5 Drawing Sheets

(51) Int. Cl.
  *B60W 10/20* (2006.01)
  *G05D 1/00* (2006.01)
  *B60W 40/08* (2012.01)
  *B60W 50/12* (2012.01)
  *B60W 30/09* (2012.01)

(52) U.S. Cl.
  CPC ..... *B60W 2420/52* (2013.01); *B60W 2540/10* (2013.01); *B60W 2540/12* (2013.01); *B60W 2540/18* (2013.01)

(56) References Cited

U.S. PATENT DOCUMENTS

| | | | |
|---|---|---|---|
| 6,679,702 B1 | 1/2004 | Rau | |
| 6,792,363 B1* | 9/2004 | Bye | G05D 1/0005 |
| | | | 701/2 |
| 7,424,414 B2 | 9/2008 | Craft | |
| 8,398,405 B2 | 3/2013 | Kumar | |
| 9,174,652 B2 | 11/2015 | Chang | |
| 9,381,916 B1 | 7/2016 | Zhu et al. | |
| 9,396,667 B1 | 7/2016 | Bober et al. | |
| 2001/0021888 A1* | 9/2001 | Burns | G05D 1/0278 |
| | | | 701/23 |
| 2009/0326798 A1* | 12/2009 | Insolia | G01C 21/3484 |
| | | | 701/533 |
| 2011/0231052 A1 | 9/2011 | Ellis et al. | |
| 2012/0083947 A1* | 4/2012 | Anderson | B60W 30/09 |
| | | | 701/3 |
| 2012/0109610 A1* | 5/2012 | Anderson | B60W 30/09 |
| | | | 703/8 |
| 2012/0135382 A1 | 5/2012 | Winston et al. | |
| 2015/0258996 A1 | 9/2015 | Victor et al. | |
| 2015/0262484 A1 | 9/2015 | Victor et al. | |
| 2015/0353093 A1 | 12/2015 | Pallett | |
| 2016/0091325 A1* | 3/2016 | Takamatsu | B60W 30/12 |
| | | | 701/408 |

FOREIGN PATENT DOCUMENTS

| | | |
|---|---|---|
| FR | 2882719 A1 | 9/2006 |
| FR | 2882720 A1 | 9/2006 |
| JP | H10230862 A | 9/1998 |
| RU | 2240600 C1 | 12/2003 |

OTHER PUBLICATIONS

Search Report issued by United Kingdom Intellectual Property Office dated Jun. 26, 2018 regarding GB Application No. 1800211.3 (5 pages).

* cited by examiner

DRIVER TRAINING SYSTEM

BACKGROUND

The Society of Automotive Engineers (SAE) has defined multiple levels of autonomous vehicle operation. At levels 0-2, a human driver monitors or controls the majority of the driving tasks, often with no help from the vehicle. At level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

DETAILED DESCRIPTION

Figure 1:
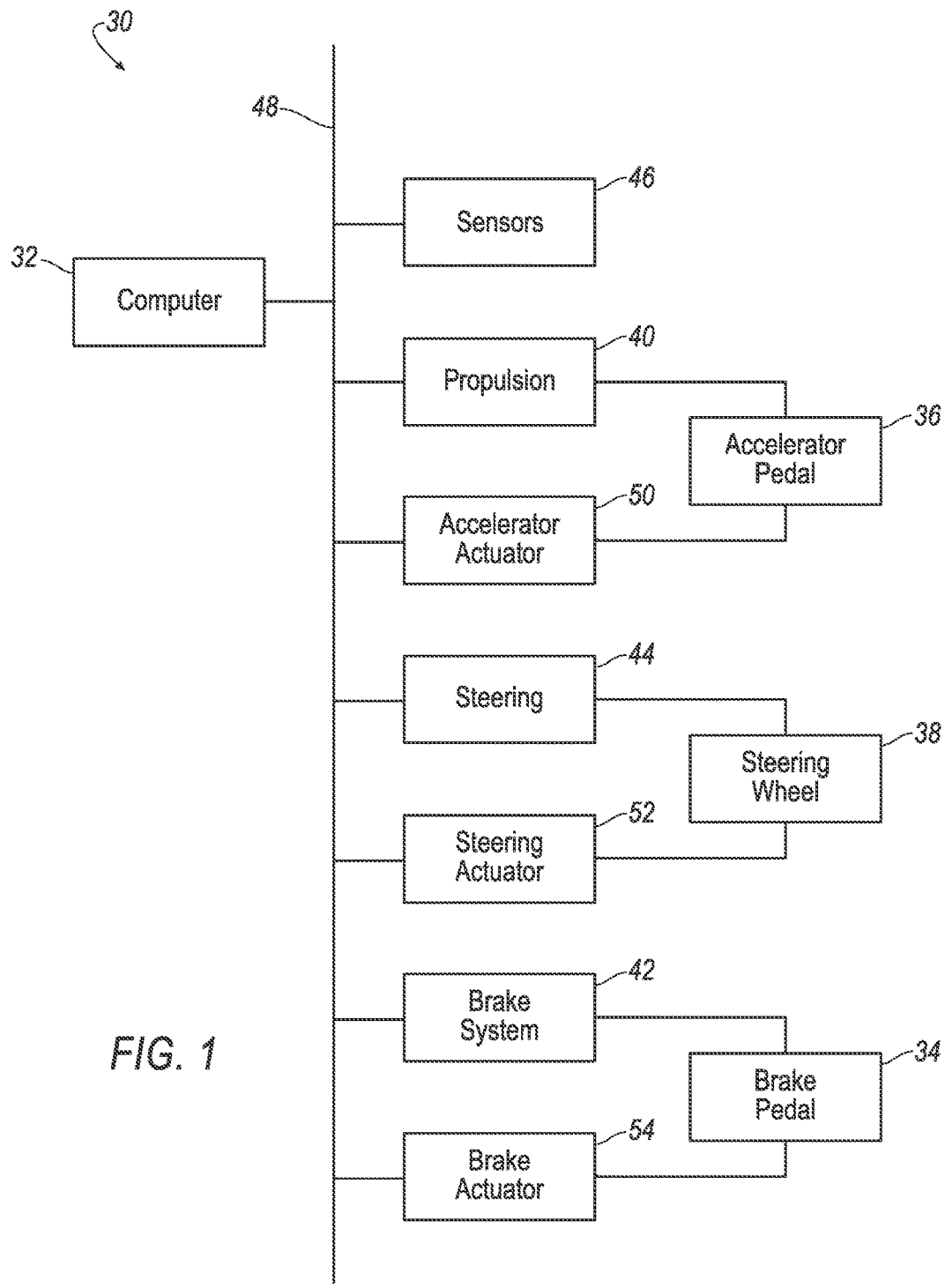
FIG. 1 is a block diagram of an exemplary control system for a vehicle.

With reference to the Figures, wherein like numerals indicate like parts throughout the several views, a computer 32 is programmed to operate a vehicle 30 along a predefined course according to predetermined criteria, record an optimal path through the predefined course based on operation of the vehicle 30 according to the predetermined criteria, monitor operation of at least one vehicle control 34, 36, 38 while the vehicle 30 is operated by a human driver along the predefined course, and actuate the at least one vehicle control 34, 36, 38 based on a predetermined deviance from the optimal path.

The computer 32 as programmed provides a driver-training system. The computer 32 provides a human driver with haptic feedback via the vehicle controls 34, 36, 38 according to, for example, how the driver deviates from the optimal path through the predefined course according to the predetermined criteria.

The vehicle 30 may be an autonomous vehicle. The computer 32 may be capable of operating the vehicle 30 independently of the intervention of a human driver, completely or to a greater or a lesser degree. The computer 32 may be programmed to operate propulsion 40, a brake system 42, steering 44, and/or other vehicle systems.

For purposes of this disclosure, an autonomous mode is defined as one in which each of propulsion 40, brake system 42, and steering 44 of the vehicle 30 are controlled by one or more computers; in a semi-autonomous mode computer(s) of the vehicle 30 control(s) one or two of vehicle propulsion 40, brake system 42, and steering 44. By way of example, accordingly, nonautonomous modes of operation in this disclosure may refer to Society of Automotive Engineers (SAE) levels 0-1, semi-autonomous modes of operation may refer to levels 2-3, and fully autonomous modes of operation may refer to levels 4-5.

With reference to FIG. 1, the vehicle 30 may include sensors 46. The sensors 46 may detect internal states of the vehicle 30, for example, wheel speed, wheel orientation, and engine and transmission variables. The sensors 46 may detect the position or orientation of the vehicle 30, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 46 may detect the external world, for example, radar sensors, scanning laser range finders, light detection and ranging (LIDAR) devices, and image processing sensors such as cameras. The sensors 46 may include communications devices, for example, vehicle-to-infrastructure (V2I) or vehicle-to-vehicle (V2V) devices.

The computer 32 is included in the vehicle 30 for carrying out various operations, including as described herein. The computer 32 is a computing device that generally includes a processor and a memory, the memory including one or more forms of computer-readable media, and storing instructions executable by the processor for performing various operations, including as disclosed herein. The memory of the computer 32 further generally stores remote data received via various communications mechanisms; e.g., the computer 32 is generally configured for communications on a controller area network (CAN) bus or the like, and/or for using other wired or wireless protocols, e.g., Bluetooth, etc. The computer 32 may also have a connection to an onboard diagnostics connector (OBD-II). Although one computer 32 is shown in FIG. 1 for ease of illustration, it is to be understood that the computer 32 could include, and various operations described herein could be carried out by, one or more computing devices.

With continued reference to FIG. 1, the computer 32 may transmit signals through a communications network 48 such as a controller area network (CAN) bus, Ethernet, Local Interconnect Network (LIN), and/or by any other wired or wireless communications network. The computer 32 may be in communication with the sensors 46, the propulsion 40, the brake system 42, and the steering 44. The computer 32 may also be in communication with one or more actuators 50, 52, 54 coupled to the vehicle controls 34, 36, 38, for example, an accelerator actuator 50, a steering actuator 52, and a brake actuator 54.

Each vehicle control 34, 36, 38 is an input device affecting operation of one or more of the propulsion 40, the brake system 42, and the steering 44. For example, a vehicle control 34, 36, 38 may be at least one of a brake pedal 34, an accelerator pedal 36, and a steering wheel 38.

Figure 3:
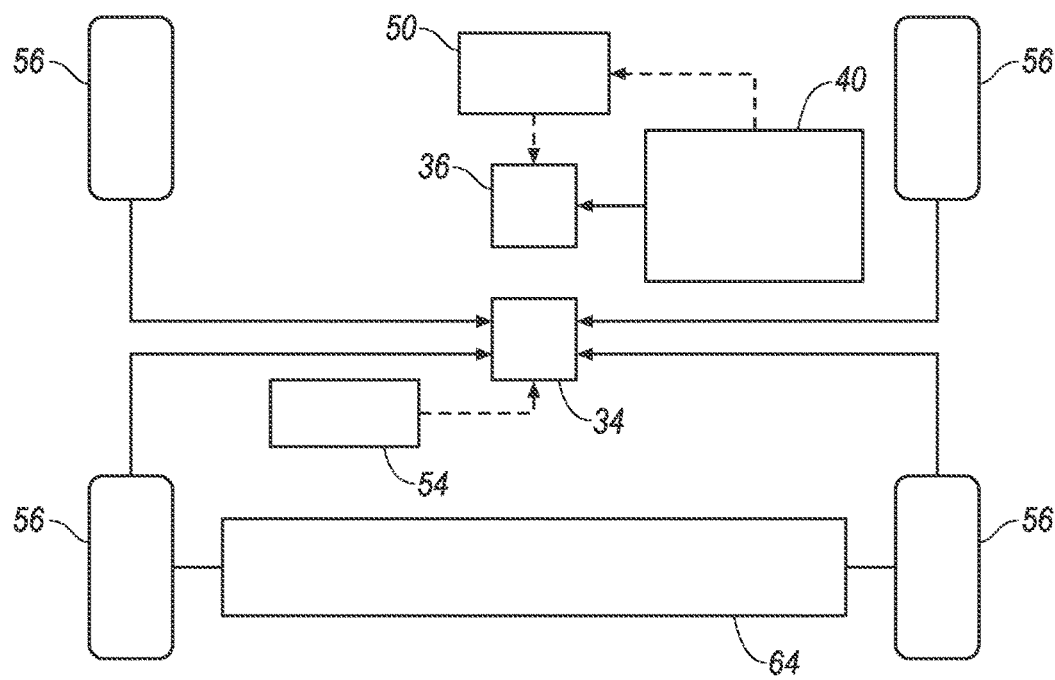
FIG. 3 is a diagram of propulsion and a brake system for the vehicle of FIG. 1.

With reference to FIGS. 1 and 3, the propulsion 40 of the vehicle 30 generates energy and translates the energy into motion of the vehicle 30. The propulsion 40 may be a known vehicle propulsion subsystem, for example, a conventional powertrain including an internal-combustion engine coupled to a transmission that transfers rotational motion to wheels 56; an electric powertrain including batteries, an electric motor, and a transmission that transfers rotational motion to the wheels 56; a hybrid powertrain including elements of the conventional powertrain and the electric powertrain; or any other type of propulsion. The propulsion 40 can include an electronic control unit (ECU) or the like that is in communication with and receives input from the computer 32 and/or a human driver. The human driver may control the propulsion 40 via, e.g., the accelerator pedal 36 and/or a gear-shift lever.

The accelerator actuator 50 may be coupled to the accelerator pedal 36. The accelerator actuator 50 may be in communication with the computer 32. The accelerator actuator 50 may apply a force to the accelerator pedal 36 tending to cause the accelerator pedal 36 to move up or down. The accelerator actuator 50 may be any type of actuator, such as mechanical, hydraulic, pneumatic, thermal, magnetic, or electric.

Figure 2:
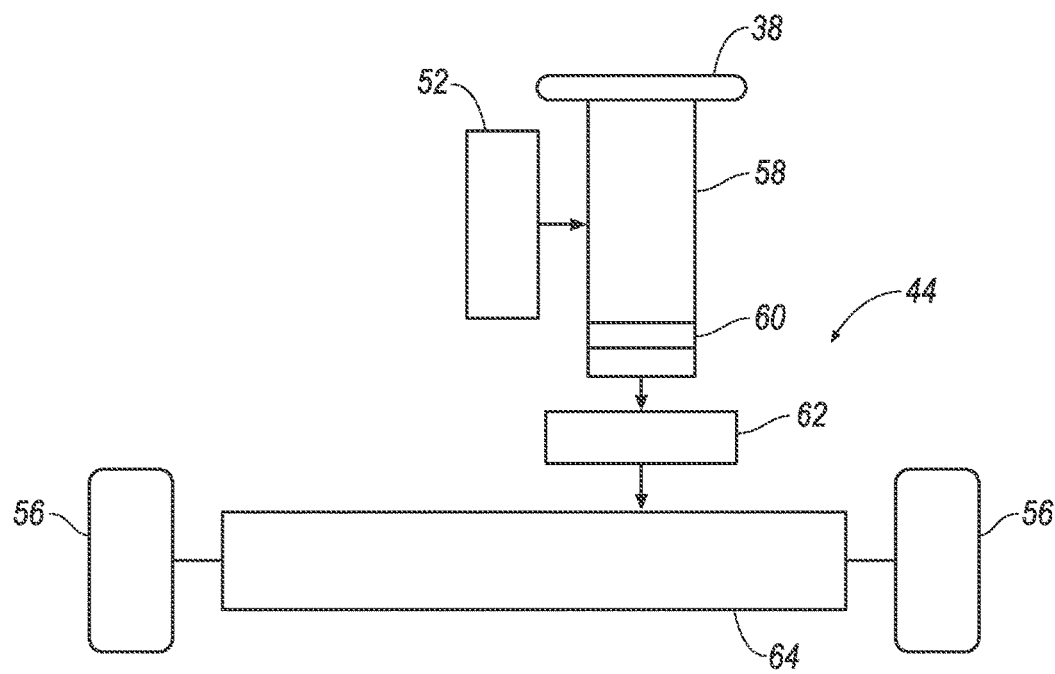
FIG. 2 is a diagram of steering for the vehicle of FIG. 1.

With reference to FIGS. 1 and 2, the steering 44 is typically a known vehicle steering subsystem and controls the turning of the wheels 56 of the vehicle 30. The steering 44 may be a rack-and-pinion system with electric power-assisted steering, a steer-by-wire system, as both are known, or any other suitable system. For example, as shown in FIG. 2, the steering 44 may include steering column 58 coupled to the steering wheel 38 and connected by a clutch 60 and a rotation-to-linear converting mechanism 62 to a steering rack 64. The steering 44 can include an electronic control unit (ECU) or the like that is in communication with and receives input from the computer 32 and/or a human driver. The human driver may control the steering 44 via, e.g., the steering wheel 38.

The steering actuator 52 may be coupled to the steering wheel 38. The steering actuator 52 may be in communication with the computer 32. The steering actuator 52 may apply a torque to the steering wheel 38 tending to cause the steering wheel 38 to rotate clockwise or counterclockwise. The steering actuator 52 may be any type of actuator, such as mechanical, hydraulic, pneumatic, thermal, magnetic, or electric.

With reference to FIGS. 1 and 3, the brake system 42 is typically a known vehicle braking subsystem and resists the motion of the vehicle 30 to thereby slow and/or stop the vehicle 30. The brake system 42 may be friction brakes such as disc brakes, drum brakes, band brakes, etc.; regenerative brakes; any other suitable type of brakes; or a combination. The brake system 42 can include an electronic control unit (ECU) or the like that is in communication with and receives input from the computer 32 and/or a human driver. The human driver may control the brake system 42 via, e.g., the brake pedal 34.

The brake actuator 54 may be coupled to the brake pedal 34. The brake actuator 54 may be in communication with the computer 32. The brake actuator 54 may apply a force to the brake pedal 34 tending to cause the brake pedal 34 to move up or down. The brake actuator 54 may be any type of actuator, such as mechanical, hydraulic, pneumatic, thermal, magnetic, or electric.

The computer 32 may be programmed to operate the vehicle 30 according to an operation mode selected by, e.g., a human driver. The human driver may select the operation mode through a user interface (not shown), and the computer receives the selection. The operation modes may include a fully autonomous mode, a nonautonomous mode, and a shared mode.

In the fully autonomous mode, the human driver may be prohibited from operating any vehicle controls 34, 36, 38. Commands delivered through any vehicle controls 34, 36, 38 may be ignored by the computer 32. The computer 32 may operate the vehicle 30 in SAE level 4 or 5.

In the nonautonomous mode, at least one actuator 50, 52, 54 is prevented from actuating. The vehicle 30 may operate in SAE level 0 or 1. The vehicle 30 may be controlled by the human driver through the vehicle controls 34, 36, 38.

In the shared mode, the human driver may be permitted to operate at least one vehicle control 34, 36, 38, and at least one actuator 50, 52, 54 is permitted to actuate. More specifically, the actuator 50, 52, 54 corresponding to the vehicle control 34, 36, 38 operated by the human driver is permitted to actuate. The vehicle 30 in the shared mode may be nonautonomous (SAE level 0 or 1) or semi-autonomous (SAE level 2 or 3). For example, in the shared mode, the computer 32 may operate the propulsion 40 and the brake system 42, the human driver may operate the steering 44 through the steering wheel 38, and the computer 32 may actuate the steering actuator 52 to provide feedback to the human driver through the steering wheel 38. For another example, the human driver may operate the propulsion 40 through the accelerator pedal 36, the brake system 42 through the brake pedal 34, and the steering 44 through the steering wheel 38; and the computer 32 may actuate the accelerator actuate 50, the steering actuator 52, and the brake actuator 54 to provide feedback to the human driver through all the vehicle controls 34, 36, 38.

Figure 4:
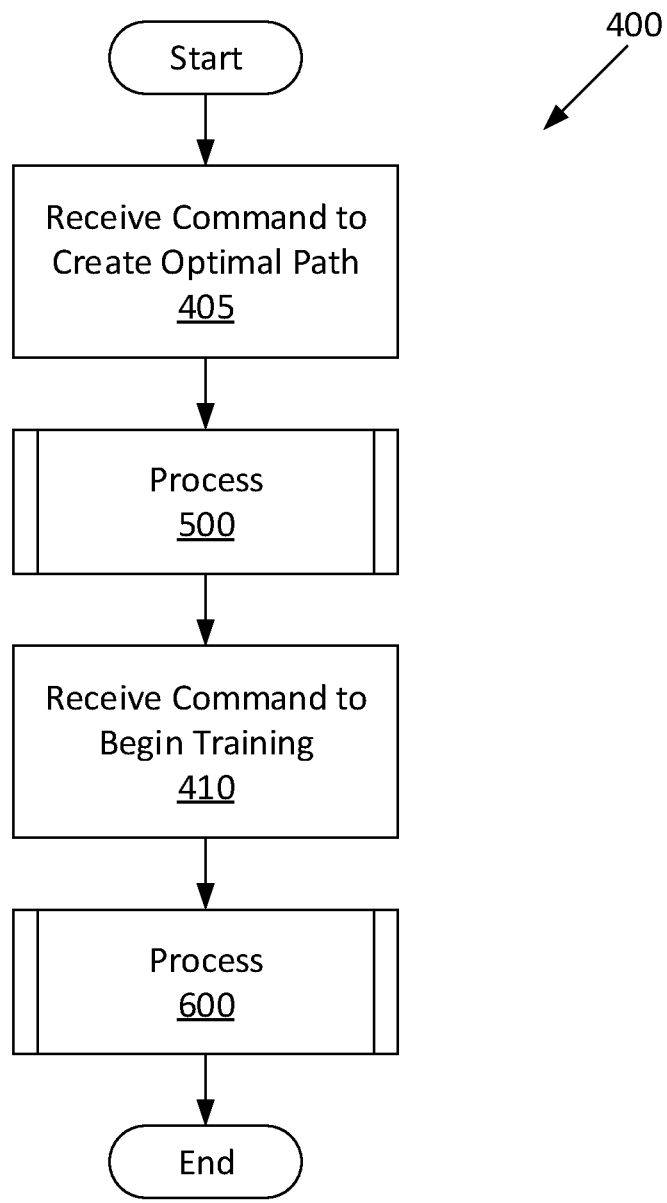
FIG. 4 is a process flow diagram of an exemplary process for selecting a mode of operation of the vehicle of FIG. 1.

FIG. 4 is a process flow diagram illustrating an exemplary process 400 for controlling the vehicle 30. The computer 32 is programmed to carry out operations of the process 400.

The process 400 begins in a block 405, in which the computer 32 receives a command to create an optimal path. An "optimal path" is described below with respect to a block 520 of a process 500. The computer 32 may receive the command through, e.g., a user interface (not shown).

Next, the computer 32 carries out a process 500. During the process 500, the computer 32 may operate the vehicle 30 in the fully autonomous mode. The computer operates the vehicle 30 along a predefined course according to predetermined criteria, which may be received with the command in the block 405 or received in separate step(s). The computer 32 records the optimal path through the predefined course based on operation of the vehicle according to the predetermined criteria. The process 500 is described in more detail below.

Next, in a block 410, the computer receives a command to begin a training run. The computer 32 may receive the command through, e.g., the user interface (not shown).

Next, the computer 32 carries out a process 600. During the process 600, the computer may operate the vehicle 30 in the shared mode. The computer 32 monitors operation of at least one vehicle control 34, 36, 38 while the vehicle 30 is operated by a human driver along the predefined course. The computer 32 may actuate at least one vehicle control 34, 36, 38 based on a predetermined deviance from the optimal path. The optimal path may have been recorded during the process 500. The process 600 is described in more detail below. Following the process 600, the process 400 ends.

Figure 5:
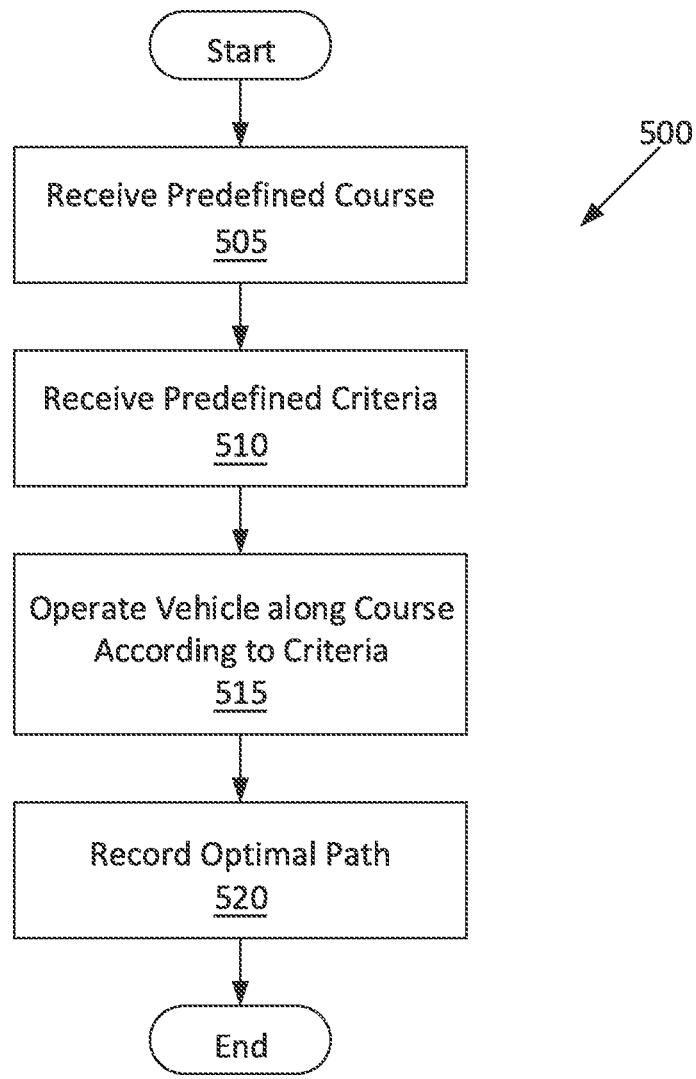
FIG. 5 is a process flow diagram of an exemplary process for creating an optimal path through a predefined course by the vehicle of FIG. 1.

FIG. 5 is a process flow diagram illustrating an exemplary process 500 for creating the optimal path through a predefined course. The computer 32 is programmed to carry out operations of the process 500. The process 500 may be carried out within the process 400 above or as a standalone process.

The process 500 begins in a block 505, in which the computer 32 receives a predefined course. A predefined course is a set of roadways along which the vehicle 30 is expected to navigate. The predefined course may be, for example, a closed track. The predefined course may be a set of directions from one location to another, such as travel northbound on First Street, turn left onto an onramp, travel east on an interstate for 4.3 miles, etc. A predefined course does not include instructions for a manner of traveling along the predefined course, such as vehicle speed or choice of lane or widthwise position on a closed track. The predefined course may be received via, e.g., user input.

Next, in a block 510, the computer 32 receives a selection of the predetermined criteria. The predetermined criteria may include a metric or combination of metrics to optimize while operating the vehicle 30 along the predefined course. For example, the predetermined criteria may include a selection of one of speed, comfort, and safety. Selecting "speed" may cause the computer 32 to minimize completion time along the predefined course, that is, finish the predefined course as quickly as possible. Selecting "comfort" may cause the computer 32 to maximize occupant comfort while operating the vehicle 30 along the course, such as by minimizing hard braking, quick accelerating, and sharp turns. Selecting "safety" may cause the computer 32 to minimize the likelihood that the vehicle 30 is involved in a collision while completing the course. Each of the predetermined criteria of speed, comfort, and safety may be subject to constraints from other criteria. For example, the speed criteria may minimize completion time while achieving performance thresholds for comfort and safety. The predetermined criteria may be received via, e.g., user input.

Next, in a block 515, the computer 32 operates the vehicle 30 along the predefined course according to the predetermined criteria. For example, if the predetermined criteria include a selection of "speed," then the computer 32 operates the vehicle 30 to minimize completion time while achieving performance thresholds for comfort and safety. The vehicle 30 therefore follows an optimal path. A path is "optimal" according to the predetermined criteria. For example, a given path may be optimal according to a selection of "speed" but not according to a selection of "comfort." Thus, by operating according to the predetermined criteria, the vehicle 30 creates and follows the optimal path for those predetermined criteria.

Next, in a block 520, the computer 32 records the optimal path through the predefined course according to the predetermined criteria, that is, records the path followed by the vehicle 30. The optimal path as recorded may include a sequence of positions relative to the predefined course; for example, the sequence of positions may run along an outside of a turn or along a middle lane of a three-lane stretch of freeway. The optimal path may further include a sequence of speeds, accelerations, and/or steering-wheel angles respectively corresponding to the positions in the sequence of positions; for example, the optimal path may define how much to slow down before a turn and how sharply to turn the steering wheel 38 through the turn. Following the block 520, the process 500 ends.

Figure 6:
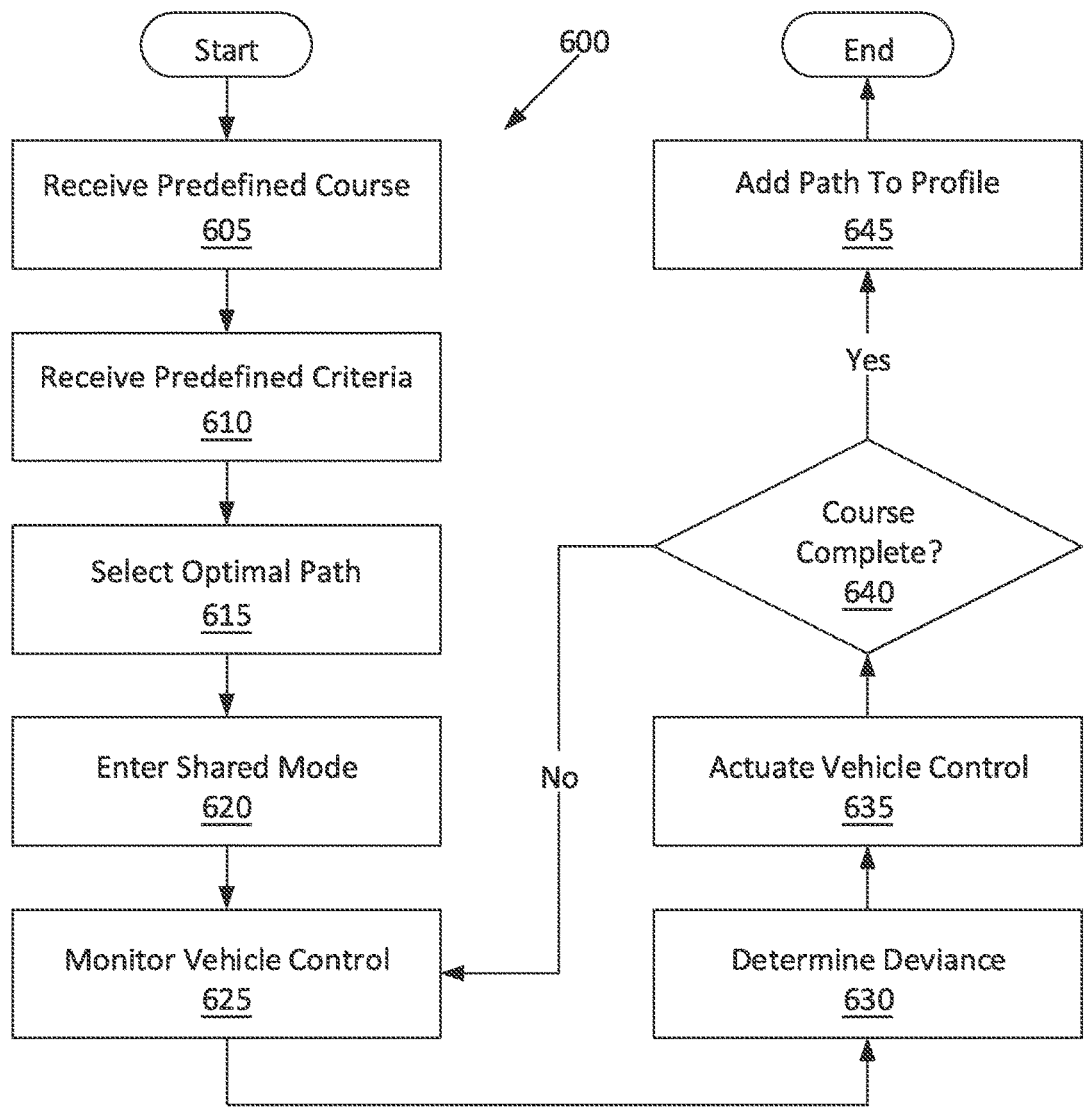
FIG. 6 is a process flow diagram of an exemplary process for training a driver through the predefined course in the vehicle of FIG. 1.

FIG. 6 is a process flow diagram illustrating the exemplary process 600 for training a driver through the predefined course with the vehicle 30. The computer 32 is programmed to carry out operations of the process 600. The process 600 may be carried out within the process 400 or as a standalone process.

The process 600 begins in a block 605, in which the computer 32 receives the predefined course, e.g., for a human driver to practice driving. For example, the predefined course may be selected by the human driver, or the computer 32 may infer the predefined course based on, e.g., a location near the predefined course, e.g., a closed track, as determined by a GPS sensor.

Next, in a block 610, the computer 32 receives the predetermined criteria mentioned above. For example, the predetermined criteria may be selected by the human driver, or the predetermined criteria may be associated with the predefined course in the memory of the computer 32.

Next, in a block 615, the computer 32 retrieves the optimal path based on the selection of the predetermined criteria. The optimal path may have been recorded in the block 520 of the process 500. The optimal path is stored in the memory of the computer 32 and is associated with the predefined course and the predetermined criteria.

Next, in a block 620, the computer 32 enters the shared mode. A human driver operates at least one of the vehicle controls 34, 36, 38. However, as described below, at least one the actuators 50, 52, 54 are enabled to actuate the vehicle controls 34, 36, 38.

Next, in a block 625, the computer 32 monitors operation of at least one vehicle control 34, 36, 38 while the vehicle 30 is operated by the human driver along the predefined course. The computer 32 may monitor operation of the brake pedal 34, the accelerator pedal 36, and/or the steering wheel 38.

Next, in a block 630, the computer 32 may determine an actual deviance from the optimal path. The computer 32 may compare an actual position of the vehicle 30 with a corresponding position from the sequence of positions of the optimal path to determine a position deviance. The computer 32 may also compare an actual speed with a respective speed from the sequence of speeds to determine a speed deviance, an actual acceleration with a respective acceleration from the sequence of accelerations to determine an acceleration deviance, and/or an actual steering-wheel angle with a respective steering-wheel angle from the sequence of steering-wheel angles to determine a steering-wheel angle deviance. The actual deviance may be one of, a combination of (e.g., an average of percentages of deviances), or an ordered list of the position deviance, the speed deviance, the acceleration deviance, and/or the steering-wheel angle deviance.

Next, in a block 635, the computer 32 actuates at least one of the vehicle controls 34, 36, 38 based on a predetermined deviance from the optimal path. The predetermined deviance may be a threshold value for actuating the vehicle controls 34, 36, 38. If the deviance is below the predetermined deviance, the computer 32 does not actuate the vehicle controls 34, 36, 38. If the deviance is above the predetermined deviance, the computer 32 actuates the vehicle controls 34, 36, 38. To actuate the vehicle controls 34, 36, 38, the computer 32 instructs the actuators 50, 52, 54 via the communications network 48. A level of actuation may be based on a magnitude of the actual deviance from the optimal path and/or a profile of the human driver. For example, a greater actual deviance may cause the computer 32 to actuate the vehicle controls 34, 36, 38 by a greater amount, such as the steering wheel 38 pushing against the turning by the human driver with a greater torque. For another example, the profile may include data associated with the human driver, such as time accumulated by the driver in the vehicle 30 in shared mode and/or monitored paths through the predefined course with the vehicle 30 operated by the human driver. If the profile of the driver indicates relatively high deviance, e.g., above a "high deviance" threshold, at one of the positions of the optimal path during previous monitored paths, then the computer 32 may increase a level of actuation at that position. For a more specific example, if the profile of the driver indicates a deviance above the "high deviance" threshold at one of the positions of the optimal path after a threshold number of previous monitored paths, e.g., five, then the computer 32 may increase a level of actuation at that position.

Next, in a decision block 640, the computer 32 determines whether the vehicle 30 has completed the predefined course. If the vehicle 30 has not completed the predefined course, the process 600 proceeds back to the block 625 to continue monitoring the vehicle controls 34, 36, 38.

If the vehicle 30 has completed the predefined course, in the block 645, the computer 32 records an actual path of the vehicle 30 through the predefined course while operated by the human driver. The monitored path is added to the profile for the human driver. Following the block 645, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer programmed to:
   autonomously operate a vehicle along a predefined course according to predetermined criteria;
   simultaneously record an optimal path through the predefined course based on operation of the vehicle according to the predetermined criteria;
   then monitor operation of at least one vehicle control while the vehicle is operated by a human driver along the predefined course; and
   while monitoring, actuate the at least one vehicle control based on a predetermined deviance from the recorded optimal path.

2. The computer of claim 1, wherein the optimal path includes a sequence of positions relative to the predefined course.

3. The computer of claim 2, wherein the optimal path includes a sequence of speeds and accelerations respectively corresponding to the positions.

4. The computer of claim 3, wherein the optimal path includes a sequence of steering-wheel angles respectively corresponding to the positions.

5. The computer of claim 1, wherein the at least one vehicle control is at least one of a brake pedal, an accelerator pedal, and a steering wheel.

6. The computer of claim 1, further programmed to receive a selection of the predetermined criteria, and select the optimal path based on the selection of the predetermined criteria.

7. The computer of claim 6, wherein the predetermined criteria include one of speed, comfort, and safety.

8. The computer of claim 1, wherein a level of actuation of the actuator is based on a magnitude of an actual deviance from the optimal path.

9. The computer of claim 1, wherein a level of actuation of the actuator is based on a profile of the human driver.

10. The computer of claim 9, wherein the profile includes monitored paths through the predefined course with the vehicle operated by the human driver.

11. The computer of claim 1, further programmed to receive a selection of an operation mode from a fully autonomous mode in which the human driver is prohibited from operating any vehicle controls, a nonautonomous mode in which the at least one actuator is prevented from actuating, and a shared mode in which the human driver is permitted to operate at least one vehicle control and in which the at least one actuator is permitted to actuate.

12. A method comprising:
    autonomously operating a vehicle along a predefined course according to predetermined criteria;
    simultaneously recording an optimal path through the predefined course based on operation of the vehicle according to the predetermined criteria;
    then monitoring operation of a vehicle control while the vehicle is operated by a human driver along the predefined course; and
    while monitoring, actuating the vehicle control based on a predetermined deviance from the optimal path.

13. The method of claim 12, wherein the optimal path includes a sequence of respective positions relative to the predefined course, speeds, accelerations, and steering-wheel angles.

14. The method of claim 12, wherein the at least one vehicle control is at least one of a brake pedal, an accelerator pedal, and a steering wheel.

15. The method of claim 12, further comprising receiving a selection of the predetermined criteria, and selecting the optimal path based on the selection of the predetermined criteria.

16. The method of claim 15, wherein the predetermined criteria includes one of speed, comfort, and safety.

17. The method of claim 12, wherein a level of actuation of the actuator is based on a magnitude of an actual deviance from the recorded path.

18. The method of claim 12, wherein a level of actuation of the actuator is based on a profile of the human driver.

19. A vehicle comprising:
    a vehicle control;
    an actuator coupled to the vehicle control; and
    a computer in communication with the actuator and programmed to autonomously operate a vehicle along a predefined course according to predetermined criteria, simultaneously record an optimal path through the predefined course based on operation of the vehicle according to the predetermined criteria, then monitor operation of the vehicle control while the vehicle is operated by a human driver along the predefined course, and while monitoring, instruct the actuator to actuate based on a predetermined deviance from the optimal path.

20. The vehicle of claim 19, wherein the vehicle control is a brake pedal; further comprising an accelerator pedal, a steering wheel, a second actuator coupled to the accelerator pedal, and a third actuator coupled to the steering wheel; wherein the computer is in communication with the second and third actuators and is programmed to monitor operation of the accelerator pedal and the steering wheel while the vehicle is operated by a human driver along the predefined course, and instruct the second and third actuators to actuate based on the predetermined deviance from the optimal path.

* * * * *